Figure 1:
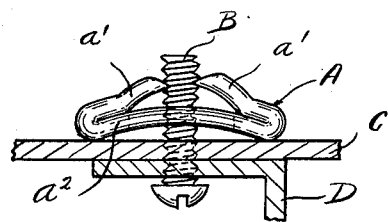

March 14, 1944.   J. W. SIMMONS   2,344,423
FASTENER
Filed May 4, 1943

INVENTOR.
BY John W. Simmons
Hull & West
ATTORNEYS

Patented Mar. 14, 1944

2,344,423

UNITED STATES PATENT OFFICE 2,344,423

FASTENER

John W. Simmons, Cleveland Heights, Ohio

Application May 4, 1943, Serial No. 485,607

14 Claims. (Cl. 85—36)

This invention relates to fasteners of the class commonly known as speed nuts, and one of its objects is to provide a device of this kind that is simple of construction and is inexpensive of manufacture—the same being made of wire and so designed as to adapt it to high speed production on automatic machines. Other objects are to provide a device of the aforesaid class that is highly efficient, that is very convenient of use, and the character and construction of which precludes its holding parts, which are placed under compression when the device is in use, from passing through dead center, so to speak. That is, the terminals of the holding parts that are shaped and positioned for engagement with the opposite sides of an entering element (which may consist of a screw, stud, lug or the like) are incapable of passing through the plane of the axes on which said holding parts swing as the fastener is compressed axially of the entering element. This is one of several advantages my wire construction for quick acting fasteners has over the prevailing sheet metal constructions.

Being constructed of wire, my improved fastener also retains its resiliency or effectiveness longer, and is less likely to become permanently deformed, or to have its holding qualities impaired by abuse, than speed nuts constructed of sheet metal.

A further object of the invention is to provide, in certain embodiments thereof, a plurality of sets of opposed grasping parts that are spaced from each other axially of the entering element and wherein the direction of force exerted upon said element by one set of grasping parts is at substantially right angles to the direction of force imposed thereon by an adjacent set.

The foregoing objects and advantages, with others hereinafter appearing, are attained in the embodiments of my invention illustrated in the accompanying drawing wherein like reference characters designate corresponding parts throughout the several views.

Figure 4:
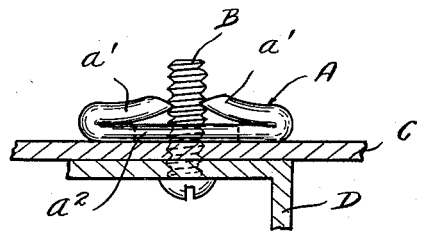
Figure 2:
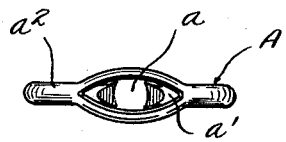
Figure 5:
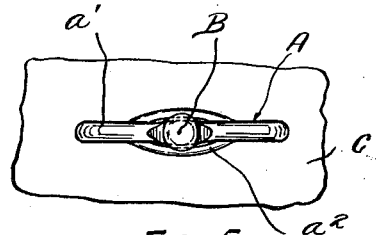
Figure 3:
Figure 6:
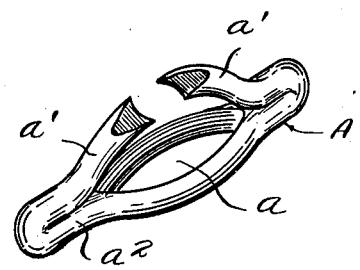
Figure 7:
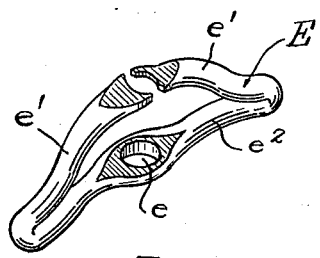
Figure 8:
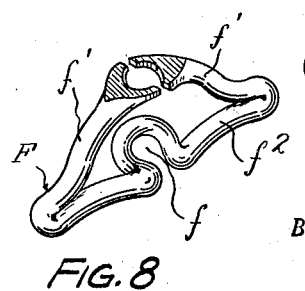
Figure 9:
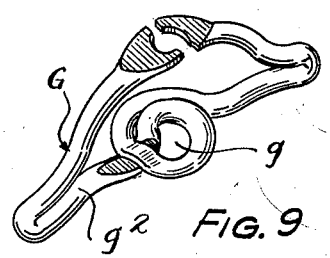

In the drawing, Fig. 1 represents a side elevation of one form of my improved fastener, and shows the same applied to an entering element, but before the fastener is compressed; Fig. 2 is a bottom plan view of the fastener shown in Fig. 1; Fig. 3 is a transverse section; Fig. 4 is a view, similar to Fig. 1, showing the condition of the fastener when it is compressed and the assembled parts are firmly drawn together by the entering element; Fig. 5 is a plan view of what is shown in Fig. 4; Fig. 6 is a perspective view of the fastener illustrated in the previous views, and Figs. 7, 8 and 9 are perspective views of modified forms of the invention.

The fastener, according to Figs. 1 to 6, and designated, generally, by the reference letter A, is constructed of a single piece of wire that is originally of the same cross sectional size and shape from end to end. Substantially midway of its ends, the piece of wire is pierced or split lengthwise a suitable distance and spread to provide a hole $a$ for the passage of an entering element B. The entering element may consist of a conventional screw, as shown, or it may be a smooth stud, or one having annular grooves, or it may consist of a lug of suitable cross sectional shape, either smooth, or serrated along its opposite sides for better cooperation with the holding parts of the fastener. These various expedients are common in the art and are, therefore, deemed unnecessary of illustration.

About half way between its longitudinal center and each of its ends, the piece of wire whereof the fastener is constructed is bent back over or upon itself and thence, at an obtuse angle, away from its central portion to provide holding parts or prongs $a'$ whose terminals are shaped and positioned for engagement with opposite sides of an entering element. Said central portion and the portions adjacent thereto between the regions where the piece of wire is bent back over or upon itself, constitute the base $a^2$ of the fastener, and said base is desirably arched from end to end toward the beforementioned holding parts or prongs $a'$, as shown in Fig. 1. Also, the terminals of said holding parts or prongs, which are desirably flattened to provide teeth and are given a shape substantially complementary to the contour of the entering element, may be disposed at an angle to the axis of the hole $a$, to correspond more or less with the pitch of the thread of a screw type entering element.

In describing the manner in which the fastener is used, I shall take as an example the securing together of the apertured members C and D. The entering element B is first engaged through the apertures in the members C and D and the fastener A is then applied to said element and forced therealong, the terminals of the holding parts or prongs $a'$ ratcheting over the threads, ridges or serrations of the entering element, provided the entering element is of a type possessing one or the other of these characteristics.

With the entering element forced as far as it will go through the apertures of the members C and D, the fastener is compressed axially of the entering element (either by means of a suitable tool, or by the turning of the entering element, provided it consists of a screw or the like) until the fastener assumes approximately the condition illustrated in Fig. 4. In this condition the holding parts or prongs $a'$ are under compression, while the base $a^2$ is under tension. In the fastener assuming this condition, the parts on opposite sides of the hole $a$ are drawn into engagement with the entering element, thus enhancing the hold of the fastener upon said element.

In the form of the invention illustrated in Fig. 7, the base $e^2$ of the fastener E is preferably flattened at its center and is punched or pierced to provide the hole $e$ through which an entering element is adapted to be projected for engagement between the holding parts or prongs $e'$.

In Fig. 8 is shown a form of the invention wherein the hole $f$, for the passage of an entering element, is provided by a horseshoe bend at the middle of the base $f^2$ of the fastener F, the parts being shaped so that the center of the hole is substantially in alignment with the ends of the base.

According to Fig. 9, the hole $g$ in the base $g^2$ of the fastener G is formed by a loop in the wire, the crossed portions of the wire desirably being flattened so that all parts of the base may be in approximately the same plane.

In lieu of the horseshoe bend, as illustrated in Fig. 8, which defines a hole for the entering element, the wire in the central region of the base may be offset laterally sufficiently to provide clearance for the entering element as it is projected through the plane of the base for engagement between the holding parts $f'$.

Having thus described my invention, what I claim is:

1. A fastener constructed of a piece of wire originally of the same cross sectional size and shape from end to end and comprising a base provided with a hole for the passage of an entering element, and end portions turned back over and inclined away from the base with the terminals thereof shaped to a cross section differing from the original to provide teeth and positioned for holding engagement with the opposite sides of an entering element projected through said hole, the original cross sectional size and shape of the piece of wire remaining unchanged between the region of said hole and said terminals.

2. A fastener constructed of a piece of wire originally of the same cross sectional size and shape from end to end and comprising a base provided with a hole for the passage of an entering element, and end portions turned back over and inclined away from the base with the terminals thereof shaped to a cross section differing from the original to provide teeth and positioned for holding engagement with the opposite sides of an entering element projected through said hole, the original cross sectional size and shape of the piece of wire remaining unchanged between the region of said hole and said terminals, the base being originally arched toward said terminals and tending to straighten out as the terminals are forced toward the base axially of the entering element.

3. A fastener constructed of a piece of wire originally of the same cross sectional size and shape from end to end and comprising a base provided with an elongated hole for the passage of an entering element, and end portions turned back over and inclined away from the base with the terminals thereof shaped to a cross section differing from the original to provide teeth and positioned for holding engagement with the opposite sides of an entering element projected through said hole, the base being placed under tension and tending to elongate as the terminals are forced toward the base axially of the entering element whereby the portions of the base on opposite sides of said elongated hole are drawn toward each other.

4. A fastener constructed of a piece of wire pierced substantially midway of its ends to provide a hole for the passage of an entering element and having its end portions turned back over its central portion, the terminals of the piece of wire being shaped to a cross section differing from the original to provide teeth and positioned for holding engagement with the opposite sides of an entering element projected through said hole, the original cross sectional size and shape of the piece of wire remaining unchanged between the region of said hole and said terminals.

5. A fastener constructed of a piece of wire pierced substantially midway of its ends to provide a hole for the passage of an entering element and having its end portions turned abruptly back over its body portion and thence at an obtuse angle away from its central portion, the terminals of the piece of wire being shaped to a cross section differing from the original to provide teeth and positioned for holding engagement with the opposite sides of an entering element projected through said hole, the original cross sectional size and shape of the piece of wire remaining unchanged between the region of said hole and said terminals.

6. A fastener constructed of a piece of resilient wire pierced substantially midway of its ends to provide a hole for the passage of an entering element, said piece of wire being bent in regions approximately half way between the axis of said hole and each of its ends back upon itself and thence at an obtuse angle away from its central portion, the terminals of the piece of wire being shaped and positioned for holding engagement with the opposite sides of an entering element projected through said hole, the portion of the wire between the aforesaid regions constituting the base of the fastener and being originally arched toward the terminals, the base tending to straighten as the terminals are forced toward the base axially of the entering element.

7. A fastener constructed of a piece of resilient wire split lengthwise a suitable distance substantially midway of its ends, the severed parts being spread apart to provide a hole for the passage of an entering element, said piece of wire being bent in regions approximately half way between the axis of said hole and each of its ends abruptly back upon itself and thence at an obtuse angle away from its central portion, the terminals of the piece of wire being shaped and positioned for holding engagement with the opposite sides of an entering element projected through said hole, the portion of the wire between the aforesaid regions constituting the base of the fastener, the base tending to elongate as the terminals are forced toward the base axially of the entering element whereby the beforementioned severed parts are drawn toward each other.

8. A fastener constructed of a piece of wire originally of the same cross sectional size and shape from end to end and comprising a base, and end portions turned back over and inclined away from the base, the wire being flattened at about the longitudinal center of the base and pierced to provide a hole through which an entering element is adapted to be projected, the terminals of the aforesaid end portions being shaped to a cross section differing from the original to provide teeth and positioned for holding engagement with the opposite sides of said entering element, the original cross sectional size and shape of the piece of wire remaining unchanged between the region of said hole and said terminals.

9. A fastener constructed of a piece of wire originally of the same cross sectional size and shape from end to end and comprising a base, and end portions turned back over and inclined away from the base to provide holding parts, the base having a formation at substantially its longitudinal center to provide clearance for an entering element that is adapted to be projected through the plane of the base for engagement between the aforesaid holding parts, the terminals of the aforesaid end portions being shaped to a cross section differing from the original to provide teeth and positioned for holding engagement with the opposite sides of said entering element, the original cross sectional size and shape of the piece of wire remaining unchanged throughout the remainder of the length of said end portions.

10. A fastener constructed of a piece of wire originally of the same cross sectional size and shape from end to end and comprising a base, and end portions turned back over and inclined away from the base to provide holding parts, the wire having a horseshoe bend formation at substantially the longitudinal center of the base to provide a hole through which an entering element is adapted to be projected for engagement between the aforesaid holding parts, the terminals of the aforesaid end portions being shaped to a cross section differing from the original to provide teeth and positioned for holding engagement with the opposite sides of said entering element, the original cross sectional size and shape of the piece of wire remaining unchanged between the region of said hole and said terminals.

11. A fastener constructed of a piece of wire originally of the same cross sectional size and shape from end to end and comprising a base, and end portions turned back over and inclined away from the base to provide holding parts, the wire having a horseshoe bend formation at substantially the longitudinal center of the base to provide a hole through which an entering element is adapted to be projected for engagement between the aforesaid holding parts, the center of said hole being approximately in alignment with the ends of the base, the terminals of the aforesaid end portions being shaped to a cross section differing from the original to provide teeth and positioned for holding engagement with the opposite sides of said entering element, the original cross sectional size and shape of the piece of wire remaining unchanged between the region of said hole and said terminals.

12. A fastener constructed of a piece of wire originally of the same cross sectional size and shape from end to end and comprising a base, and end portions turned back over and inclined away from the base to provide holding parts, the wire being coiled at substantially the longitudinal center of the base to provide a hole through which an entering element is adapted to be projected for engagement between the aforesaid holding parts, the terminals of the aforesaid end portions being shaped to a cross section differing from the original to provide teeth and positioned for holding engagement with the opposite sides of said entering element, the original cross sectional size and shape of the piece of wire remaining unchanged between the region of said hole and said terminals.

13. A fastener constructed of a piece of wire originally of the same cross sectional size and shape from end to end and comprising a base, and end portions turned back over and inclined away from the base to provide holding parts, the wire being coiled in the nature of a flat spiral through approximately one and one-half turns at substantially the longitudinal center of the base to provide a hole for the passage of an entering element that is adapted to be engaged between the aforesaid holding parts, the parts of the wire that cross each other in the formation of said loop being flattened, the terminals of the aforesaid end portions being shaped to a cross section differing from the original to provide teeth and positioned for holding engagement with the opposite sides of said entering element, the original cross sectional size and shape of the piece of wire remaining unchanged between the region of said hole and said terminals.

14. A fastener constructed of a piece of wire originally of the same cross sectional size and shape from end to end and comprising a base, and portions turned back over and inclined away from the base to provide opposed holding parts, the base having a formation to allow at substantially its longitudinal center clearance for an entering element that is adapted to be projected through the plane of the base for engagement between the aforesaid holding parts, said holding parts in the region of their contact with said element being shaped to a cross section differing from the original for effective holding engagement with the opposite sides of said element, the piece of wire remaining unchanged in cross sectional size and shape for much of its length.

JOHN W. SIMMONS.